June 13, 1967 J. S. ECKERT 3,325,376
DISTILLATION COLUMN
Filed May 8, 1963 3 Sheets-Sheet 1

INVENTOR.
JOHN S. ECKERT
BY
ATTORNEY

June 13, 1967  J. S. ECKERT  3,325,376
DISTILLATION COLUMN
Filed May 8, 1963  3 Sheets-Sheet 2
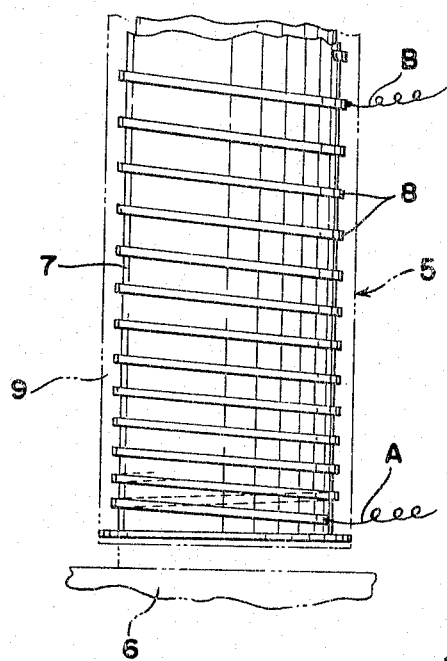
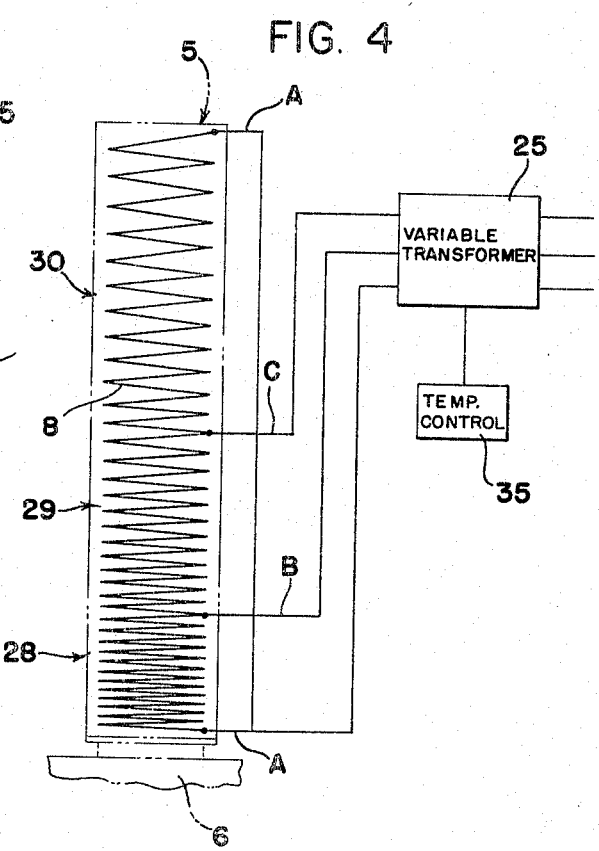
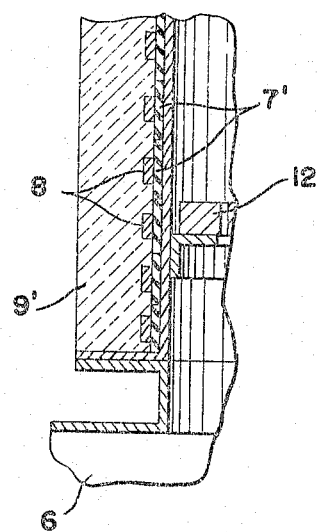
INVENTOR.
JOHN S. ECKERT
BY
ATTORNEY June 13, 1967 J. S. ECKERT 3,325,376
DISTILLATION COLUMN
Filed May 8, 1963 3 Sheets-Sheet 3

INVENTOR.
JOHN S. ECKERT
BY
ATTORNEY

United States Patent Office 3,325,376
Patented June 13, 1967

3,325,376
DISTILLATION COLUMN
John S. Eckert, Silver Lake, Ohio, assignor to The United States Stoneware Co., Tallmadge, Ohio, a corporation of Ohio
Filed May 8, 1963, Ser. No. 278,849
4 Claims. (Cl. 202—158)

It commonly happens, in the operation of a distillation column or tower, that the vapors become progressively cooler as they rise in the column due to enrichment of the liquid with the lower boiling constituents.

A variable amount of heat escapes through the column walls. This causes condensation of part of the vapor on the column wall and this condensate flows down the column wall countercurrent to the upward flow of the vapor. The wall of the column is generally insulated to reduce this effect, and sometimes a heated jacket is supplied in an attempt to offset the heat that is lost.

It has now been found that such a column is most efficiently operated by keeping the heat radiation from the column as close to zero as possible by a controlled-temperature heat barrier so that there is no change in the enthalpy of the material being processed. This is done by supplying to the wall of the column the same amount of heat as that which is normally radiated. Then, no condensate is formed on the wall due to radiant cooling, and no heat is transmitted from the wall to the contents of the column.

The heat loss becomes progressively greater from the top to the bottom of a column because of the higher temperature at or near the base, so progressively less heat is supplied to the upper portion of the column. This is advantageously accomplished by winding the column with a heating element the turns of which are arranged progressively further apart as the top of the column is approached. Alternatively, the turns of the heating element may be evenly spaced, but those near the bottom of the column may be so constituted as to give the required additional heat. If the spacing of the turns of the heating element is varied, as in the preferred design, the heating element, if constructed to supply the same amount of heat per unit of length, is advantageously attached to a strip of heat and electrical insulation which is narrower at one end than the other, and by winding the column with this strip, applying the narrower end of the strip at the bottom of the column and the wider end at the top, the required spacing of the heating element is conveniently attained. This strip of insulation prevents the coil from shorting by contact with the wall of the column, if of metal, and also limits radiation of heat from the wall.

Sometimes the thermal gradient is not enough to justify such variable-space winding. In this case, various sectors of the winding can be fed the amount of power required.

The electric power for heating is advantageously supplied from one or more single-phase windings by attaching terminals to the heating element at the top, bottom and an intermediate location in the tower. The heating system may include means for varying the power supplied depending upon the ambient temperature. This may be controlled manually, or automatically, to supply more heat in colder weather, and less heat in warmer weather.

Thus, the invention pertains to a distillation column with a heat barrier to minimize or eliminate heat loss from the column, and the tapering combination of the insulation and heating element.

The invention is described in connection with the accompanying drawings, in which—

FIGURE 3 is a view of a section of the column, similar to that shown in FIGURE 1, but with the heat insulation removed to expose the heating element;

FIGURE 4 is a diagrammatic elevation, showing a preferred arrangement for heating with a 3-phase powered system;

FIGURE 5 is a detail, similar to that shown in FIGURE 2, but with the tower wound with the strip shown in FIGURE 6;

Although the drawings show a tower or column, the whole of which is designed to operate as herein contemplated, it is to be understood that this is not necessary. The reflux derived from a total condenser behaves in a beneficial manner while the wall condensate is harmful.

Figure 1:
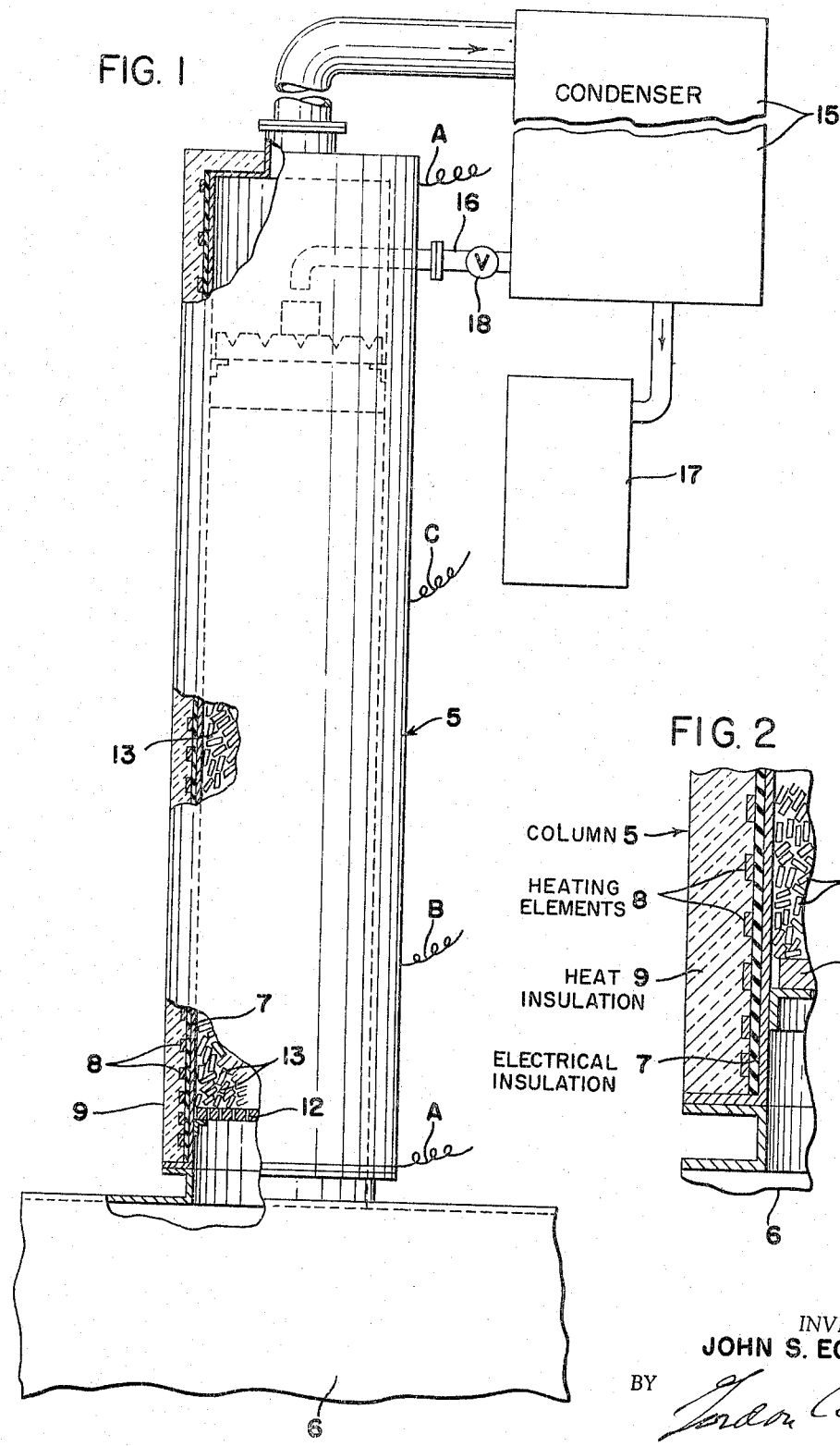
FIGURE 1 is an elevation of a distillation system, with the column partly broken away to show the heat and electrical insulations and heating element, and the packing within the column.
Figure 2:
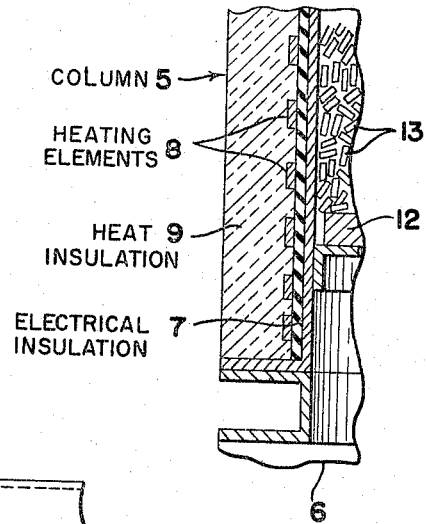
FIGURE 2 is an enlarged detail showing the insulations, heating element, etc.

In FIGURE 1, the column 5 is constructed on top of the steel stillpot 6. However, the column may be fed from any source. For example, continuous columns are quite often fed between beds. The column 5 is of uniform construction with a constant coefficient of heat transfer but variable heat differential from the bottom to the top. Insulation 7 covers the outer surface of the wall of the column, serving both as heat insulation and electrical insulation. The heating element 8 is wound about this, covered with heat insulation 9. Within the tower is the support plate 12 which supports the bed of packing elements 13. A part of the condensate from the condenser 15 is returned to the column through the line 16, and the balance is collected in a storage tank 17, or disposed of in any desired manner. The amount of return condensate or reflux is controlled by the valve means 18. The amount of heat which it is necessary to supply to element 8 is independent of both the amount of vapor passing through the column, and the amount of condensate returned to the column. It depends solely upon the temperature inside of the column, and the effectiveness of the heat insulations 7 and 9. It is noted that the heating element 8 has no effect whatsoever upon the temperature within the column; it merely prevents the formation or evaporation of condensate on the wall.

In FIGURE 4 the 3-phase transformer 25 provides three heating circuits 28, 29 and 30 through the lines A and B; B and C; and A and C. Uniform temperature is maintained within the column by having the turns of the heating coil progressively closer together at the bottom of the column, than at the top.

If the column is located outdoors, or is situated in some other place where changes in the temperature of the surrounding atmosphere are expected, the heat supplied by the heating coil may be changed to compensate for such changes. As the ambient temperature decreases, more heat is supplied, and as it rises less heat is supplied. FIGURE 4 illustrates means for doing this automatically. For this purpose, an adjustable auto transformer will be used at 25 and it will be controlled by temperature control 35. Thus, as the outside temperature lowers, the voltage over the terminals of the heating elements is increased, and more heat is supplied to the tower; the amount of heat supplied being regulated so that regardless of the outside temperature the amount of heat supplied approximates, more or less closely, the minimum required to prevent condensate forming on the inner surface of the column.

Figure 6:
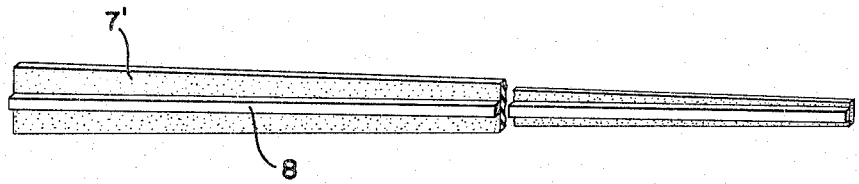
FIGURE 6 is a plan view, on a greatly reduced scale, of a tapering strip of heat insulation with the heating element attached to it.

A preferred method of applying the heat barrier is illustrated in FIGURES 5 and 6. The heating element 8 which may be a Nichrome ribbon is sewn or cemented to the tapering strip 7' of insulation, or it may be embedded in it. The insulation may be of any suitable composition such as Micarta, rubber or plastic, etc. It is preferably pre-formed, as shown in FIGURE 6.

The tapering insulation with the heating element is wound helically on the column with the respective edges abutting one another, with the wider end at the top, and it is adhered to the column by a suitable adhesive. The heat insulation 9' is then applied. It may be asbestos, binding tape, magnesia or any suitable material. Then before starting the still, the current is turned on and the heating coil is brought to temperature. The still operation is then started and carried on most efficiently with the heating element preventing heat loss through the wall of the column. The column may be operated on a batch basis or continuously.

Although FIGURE 6 illustrates the attachment of a single heating element to the strip of insulation, several heating elements may be utilized, arranged side by side, and they may be parallel, or they may be arranged progressively nearer one another toward the narrow end of the strip.

Figure 7:
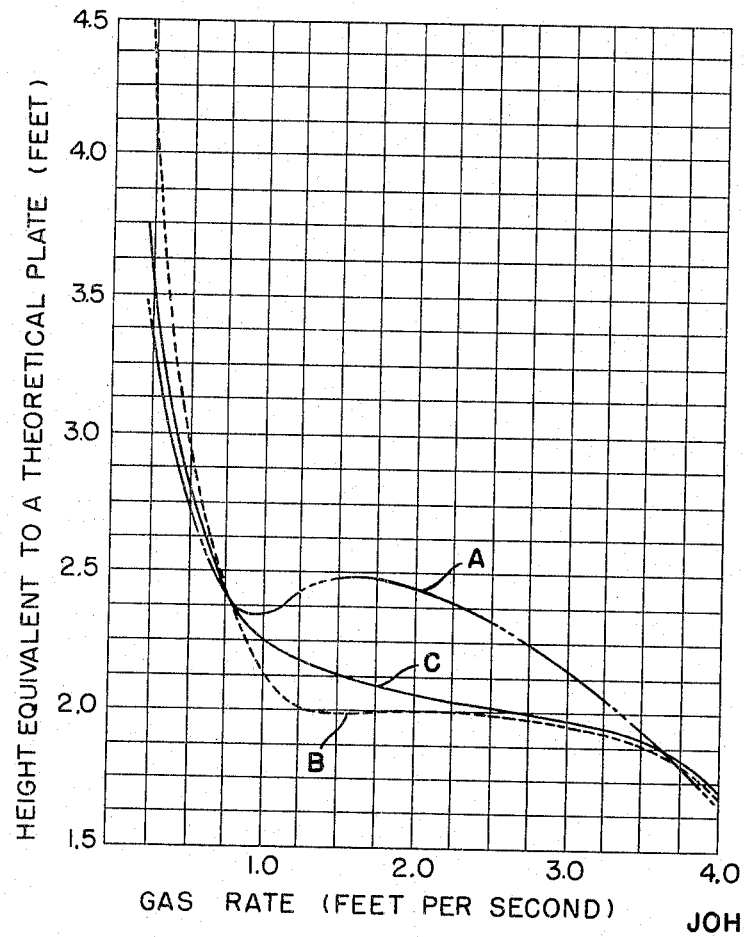
FIGURE 7 is a series of graphs which compares the efficiency of a column operated as here described with columns operated in other ways.

FIGURE 7 illustrates the advantage of using a heat barrier as contemplated by this invention, in the separation of isooctane and toluene in a 20-foot column, 15 inches in diameter operated at a reflux ratio of 6:1.

Curve B shows the height equivalent to a theoretical plate when just sufficient electrical current is run through resistance wire 8 to offset the normal heat lost by radiation through the wall of the column. In other words, heat is neither being added nor removed through the wall of the column itself.

Curve A is a plot of the height equivalent to a theoretical plate when the heat supplied to the barrier is turned off and the normal amount of heat is lost from the column through radiation from the insulated column wall.

Curve C is a plot showing the height equivalent to a theoretical plate when 25 percent more heat is supplied to the resistance winding than is required, as a consequence of which the excess heat is supplied through the column wall.

Keeping the heat transfer at the column wall at zero is quite important in that separations can be performed with shorter columns, thereby affecting an economy of as much as 20 percent or more in the construction of the column.

Where columns are located in places where the ambient temperature may vary, such as columns located outside of buildings where the temperature may vary from, for example, −20° F. to 100° F., variation in the height equivalent to a theoretical plate varies considerably through the year, and even from day to day, because of the variation in heat radiation. By controlling the amount of heat supplied at given differentials in temperature between the interior of the column and the outside atmosphere (either by manual means with reference to a calibration chart or by automatic means) the column can be operated more uniformly from day to day and throughout the year, which again results in great economies. Jacketed columns which have been used in the past primarily to prevent freeze-up, will not serve the same function as this barrier strip, because it is very difficult to adjust the temperature of the jacket to obtain zero heat transfer, particularly in view of the fact that the bottom of a column operates at a higher temperature than the top of the column, and the jacket does as much damage at one end of the column as it does good at the other end.

The column may be of ceramic material in which case the heating element may be within the wall. The heating element may be coiled about its own axis, and it may be progressively greater in diameter from the top to the bottom of the column, with the coil itself formed into a helix about the column, with the turns of the helix evenly spaced. The wall may be fabricated in sections with the different sections having a different coefficient of heat transfer, but for the purpose of the claims, such construction is considered the equivalent of the usual construction in which the temperature gradient along the wall is substantially uniform from the bottom to the top of the column. The taper of the insulation will depend upon the diameter of the column and the spacing of the heating element. Ordinarily the strip tapers along each edge at an angle of less than 15 degrees.

Variations in structure will suggest themselves to the man skilled in the art.

The invention is covered in the claims which follow.

What I claim is:

1. A distillation column having a uniform temperature gradient from the top to the bottom thereof which has adjacent the wall thereof a helical electrical resistance of uniform resistance per unit of length from one end thereof to the other, with the turns of the helix located progressively farther apart from the bottom of the column to the top to provide gradually decreasing heat to the wall of the column from the bottom to the top thereof.

2. The column of claim 1 in which means for providing current to the helical resistance is connected with temperature-operated control means located outside of the column whereby the amount of heat provided by the heating means is controlled by the temperature outside of the column.

3. A distillation column wound helically with a tapering insulation strip the turns of which are progressively farther apart from the bottom to the top of the column, with a heating element of uniform resistance per unit of length from one end to the other attached to the sheet.

4. A distillation column having the strip of claim 3 adjacent the wall thereof, with heat insulation over the outer surface of the heating element.

References Cited

UNITED STATES PATENTS

| | | | |
|---|---|---|---|
| 978,808 | 12/1910 | Ayer | 219—301 |
| 1,492,676 | 5/1924 | Clark | 219—301 X |
| 1,494,326 | 5/1924 | Adams | 219—299 X |
| 2,412,843 | 12/1946 | Spraragen | 219—46 |
| 2,519,920 | 8/1950 | Miner | 219—301 |
| 2,647,863 | 8/1953 | Kochie | 202—158 |
| 2,690,060 | 9/1954 | Legatski | 202—158 X |
| 2,847,368 | 8/1958 | Worthington et al. | 202—234 X |

NORMAN YUDKOFF, *Primary Examiner.*

F. E. DRUMMOND, *Assistant Examiner.*